(12) United States Patent
Frank et al.

(10) Patent No.: US 7,532,469 B2
(45) Date of Patent: May 12, 2009

(54) AIRFLOW SEALING MECHANISM

(76) Inventors: Vlastimil Frank, 5210 Jackson Ct., Warrenton, VA (US) 20187-4538; Allen M. Jones, 1647 Harkers Island Rd., Beaufort, NC (US) 28516; David A. Boyer, 12717 Camden Park Ct., Bristow, VA (US) 20136

( * ) Notice: Subject to any disclaimer, the term of this patent is extended or adjusted under 35 U.S.C. 154(b) by 716 days.

(21) Appl. No.: 11/076,265

(22) Filed: Mar. 10, 2005

(65) Prior Publication Data

US 2006/0261710 A1 Nov. 23, 2006

(51) Int. Cl.
H05K 7/20 (2006.01)
(52) U.S. Cl. .................. 361/695; 361/754; 439/157; 439/377
(58) Field of Classification Search ........... 361/688, 361/690, 695, 752–756, 727–731; 439/377, 439/157; 292/110; 174/51, 360; 165/80.3; 312/9.1
See application file for complete search history.

(56) References Cited

U.S. PATENT DOCUMENTS

| | | | | |
|---|---|---|---|---|
| 4,313,150 | A | * | 1/1982 | Chu ........................... 361/755 |
| 4,448,450 | A | * | 5/1984 | Kleinecke et al. ........... 292/210 |
| 5,139,430 | A | * | 8/1992 | Lewis et al. ................. 439/157 |
| 5,657,204 | A | * | 8/1997 | Hunt .......................... 361/752 |
| 5,929,370 | A | | 7/1999 | Brown |
| 5,956,228 | A | * | 9/1999 | Zahorsky et al. ............ 361/695 |
| 6,000,623 | A | | 12/1999 | Blattl |
| 6,047,836 | A | | 4/2000 | Miles |
| 6,058,011 | A | | 5/2000 | Hardt |
| 6,151,213 | A | | 11/2000 | Ater |
| 6,171,120 | B1 | * | 1/2001 | Bolich et al. ................ 439/157 |
| 6,195,266 | B1 | * | 2/2001 | Padgett et al. ............... 361/799 |
| 6,272,005 | B1 | * | 8/2001 | Jensen et al. ................ 361/680 |
| 6,272,012 | B1 | | 8/2001 | Medin |
| 6,278,608 | B1 | * | 8/2001 | Ater et al. ................... 361/695 |
| 6,285,548 | B1 | * | 9/2001 | Hamlet et al. ............... 361/695 |
| 6,381,146 | B1 | * | 4/2002 | Sevier ........................ 361/754 |
| 6,406,322 | B1 | * | 6/2002 | Barringer et al. ............ 439/377 |
| 6,493,235 | B1 | * | 12/2002 | Barringer et al. ............ 361/756 |
| 6,494,729 | B1 | * | 12/2002 | Stathopoulos et al. ........ 439/160 |
| 6,529,383 | B1 | * | 3/2003 | Barringer et al. ............ 361/754 |
| 6,759,588 | B1 | | 7/2004 | Banton |
| 6,851,867 | B2 | * | 2/2005 | Pang et al. ................... 385/88 |
| 7,023,703 | B2 | * | 4/2006 | Peloza ........................ 361/727 |
| 7,127,791 | B2 | * | 10/2006 | Barringer et al. ............. 29/456 |
| 7,267,563 | B2 | * | 9/2007 | Stowers et al. .............. 439/157 |

* cited by examiner

*Primary Examiner*—Boris L Chervinsky
*Assistant Examiner*—Courtney L Smith
(74) *Attorney, Agent, or Firm*—Schwegman, Lundberg & Woessner, P.A.

(57) ABSTRACT

In a module unit in a housing, the module unit is designed to easily slide into and out of the housing. The housing has one or more plenums through which convective air circulates around and through the module unit. A sealing mechanism seals openings that connect the module unit and one or more of the plenums. When the module unit is removed from the housing, a lift mechanism removes the sealing mechanism from the openings, and allows the module unit to be easily removed from the housing. After reinsertion of the module unit, the lift mechanism reinserts the sealing mechanism into the openings.

19 Claims, 5 Drawing Sheets

AIRFLOW SEALING MECHANISM

TECHNICAL FIELD

The invention relates to airflow systems for apparatuses that require removal of module units and the maintenance of seals.

BACKGROUND

Many computer systems and other apparatuses are housed in module units that have power supplies, processors, memory, integrated circuits, and other heat producing components. To remove the heat from the system, these module units are normally surrounded by a plenum and inter-component air spaces through which convective cooling air circulates. In many systems, seals are placed between the module units and the surrounding plenums to prevent the leakage of the cooling air.

In some applications, only front access to the system's main unit is permitted for service of the components. In these situations, the module units are designed to slide into and out of the main unit through the front panel of the main unit. Stationary seals do not work well in these conditions, since when a module unit is removed from the housing, seals between the module unit and the plenum are disturbed and/or damaged. Then, upon reinsertion of the module, the seals between the module and the plenum can not be re-established. The failure to completely reseal these connections results in leakage of the cooling air, system malfunction, damage of electronics hardware, and/or long-term reliability reductions. It is therefore a general goal of such systems to reduce losses of cooling air. The reduction of cooling air loss is particularly important in systems that have rather high airflow requirements (with little or no airflow leakage permitted), and that further have modules that are densely packed in the housing.

For low airflow systems, baffles, brush seals and the like have been used in attempts to establish a seal that can be unsealed when a module unit is removed, and reestablished when the module unit is replaced. In other low airflow systems, in place of or in addition to such seals, a higher flow rate of convective cooling air is induced through the module unit. However, in many systems, even with baffles, brush seals, and other similar sealing mechanisms, it is difficult to maintain minimum airflow leakage since by design, the module unit is set up for easy removal, and these designs unfortunately provide avenues for the convective air to escape. Such system designs also suffer from airflow leakage caused by shock or vibration events.

SUMMARY OF AN EMBODIMENT

An embodiment of the invention employs a lift mechanism assembly to establish a seal between a module unit and a plenum, to disassociate the seal when the module unit is removed from its housing, and then to reestablish the seal between the module unit and the plenum after the module unit is returned to its housing. The lift mechanism allows for the easy removal and replacement of the module unit without disassembly of any other unit in the system, and without sacrificing a tight seal for a convective air path.

In an embodiment, the lift mechanism is mounted inside an air plenum. In this embodiment, the lift mechanism has one or more sealing frames, and each sealing frame has one or more gaskets. The sealing frames, when lowered by the lift mechanism, seal the area between the air plenum and module unit to prevent leakage of cooling air flowing through the module unit and plenum. When the sealing frames are lifted by the lift mechanism above the top of the module unit, the module unit can be removed without any damage to the sealing gaskets. In one embodiment, the lifting mechanism includes a two-armed lever that expands and collapses to extend the frame with gaskets and retract the frame with gaskets respectively. In an embodiment, when an actuator shaft is rotated, the arms of the lift mechanism will expand or collapse depending on the direction of rotation. In another embodiment, a locking bushing is provided to immobilize the actuator shaft after the sealing frames gaskets are compressed to a fixed amount. This locking bushing prevents any movement of the lift mechanism which may be introduced by high vibration and/or shock environments.

It is therefore an object of an embodiment of the invention to provide a sealing mechanism for a module unit that permits the establishment of a seal, the disassociation of the seal, and the re-establishment of the seal.

DETAILED DESCRIPTION OF AN EMBODIMENT

Figure 1:
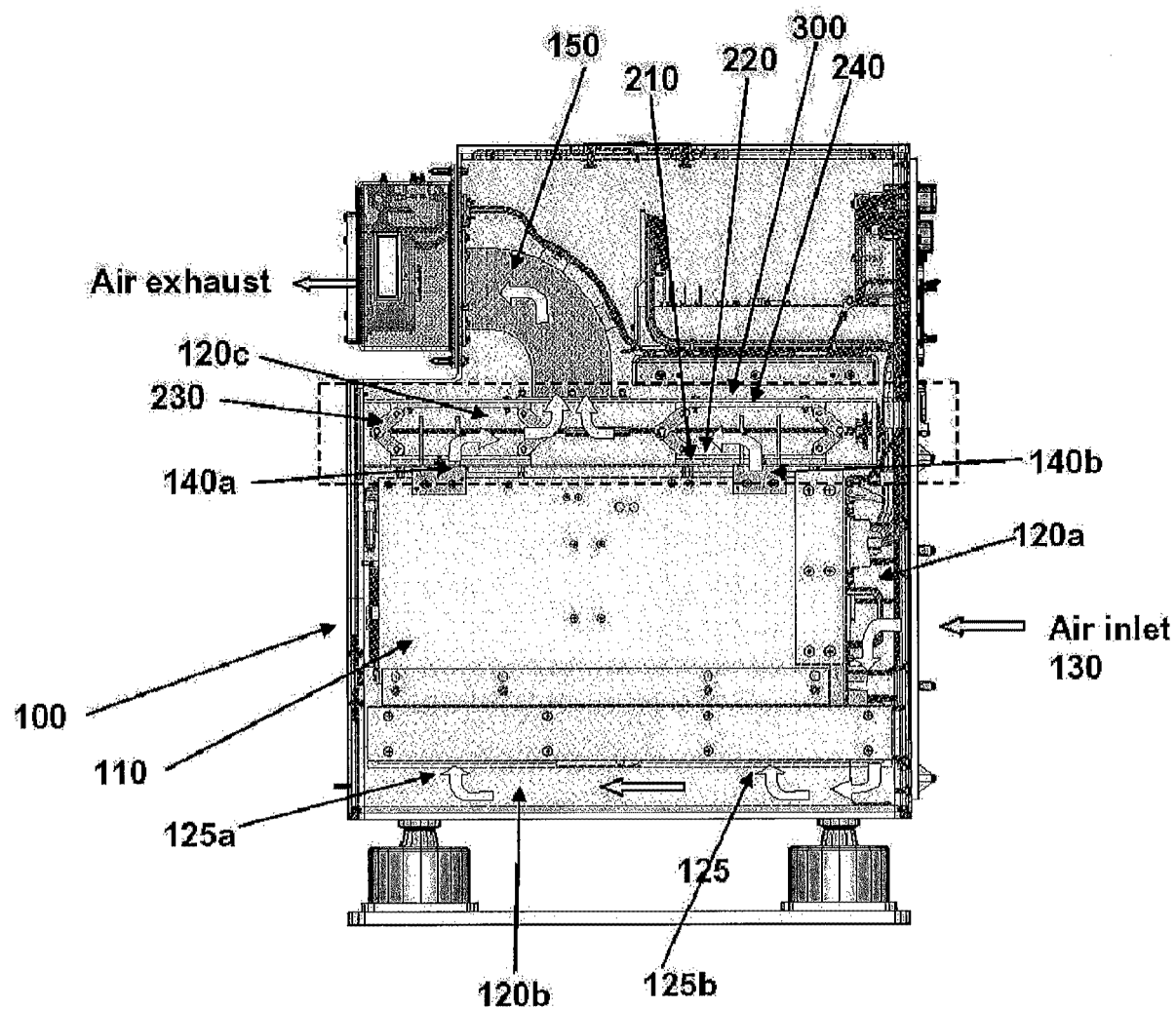
FIG. 1 illustrates a side view of an apparatus upon which an embodiment of the present invention may be installed.

An embodiment of the invention, installed into a module which houses components such as processors, power supplies, and circuit boards, is illustrated in FIG. 1. In FIG. 1, a unit 100 houses a module unit 110. The module unit 110 may have any number and type of components therein such as processors, memory, power supplies, integrated circuits, and circuit boards. Surrounding the module unit 110 are air spaces (or plenums) 120 for the transport of convective cooling air. Within the module unit 110 itself there are also air spaces (not shown in FIG. 1) between the components through which air may circulate. In the embodiment of FIG. 1, the convective cooling air enters into an inlet at 130 and into airspace 120a. The air flows down to the air space 120b, and into the unit 110 at openings 125a and 125b. The convective air exits the module unit 110 at openings 140a and 140b, into air space 120c inside plenum 300, and then exits the unit 100 through rear plenum 150.

Figure 2:
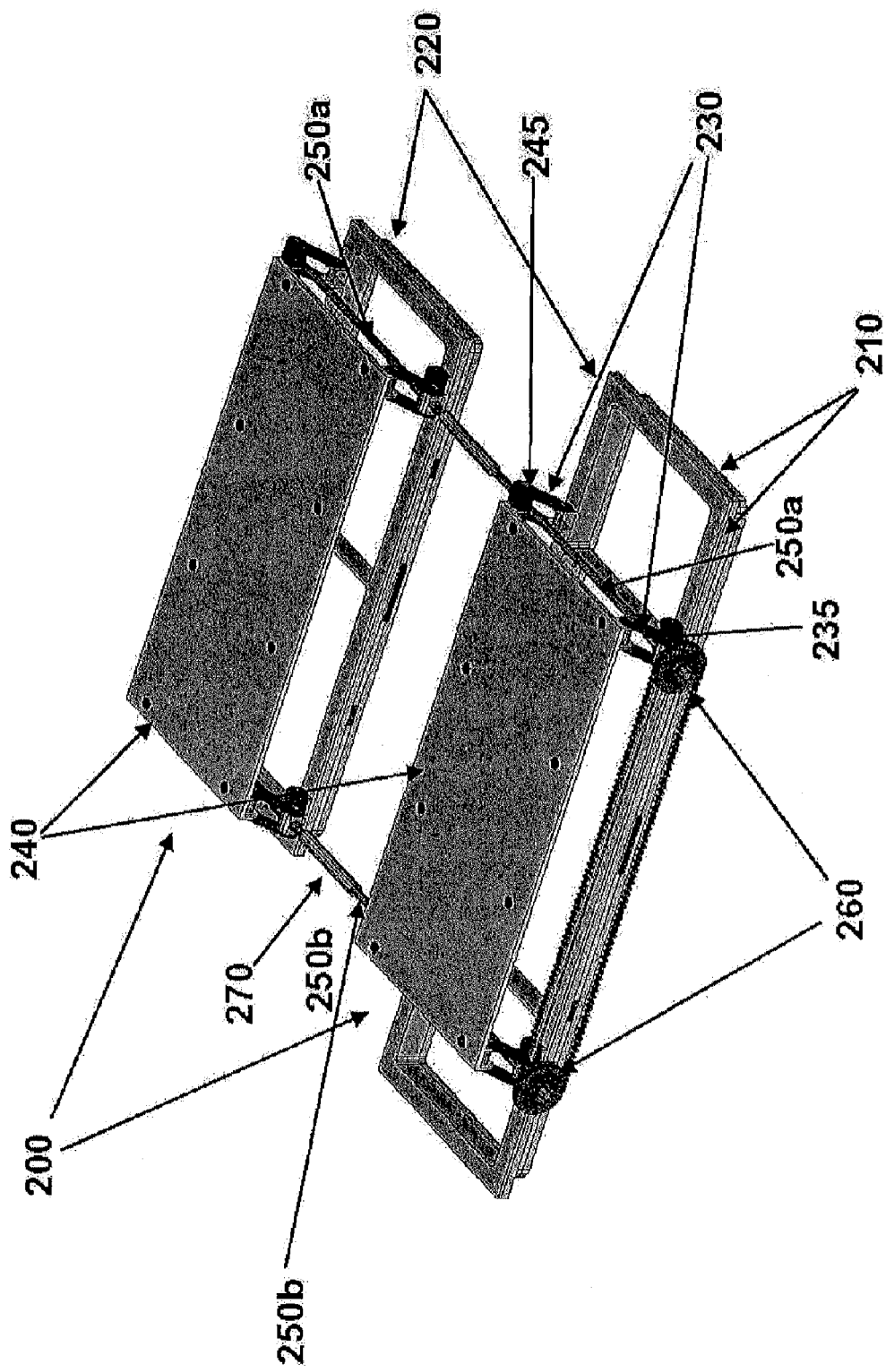
FIG. 2 illustrates an elevated perspective view of an embodiment of an airflow sealing mechanism of the invention.
Figure 4:
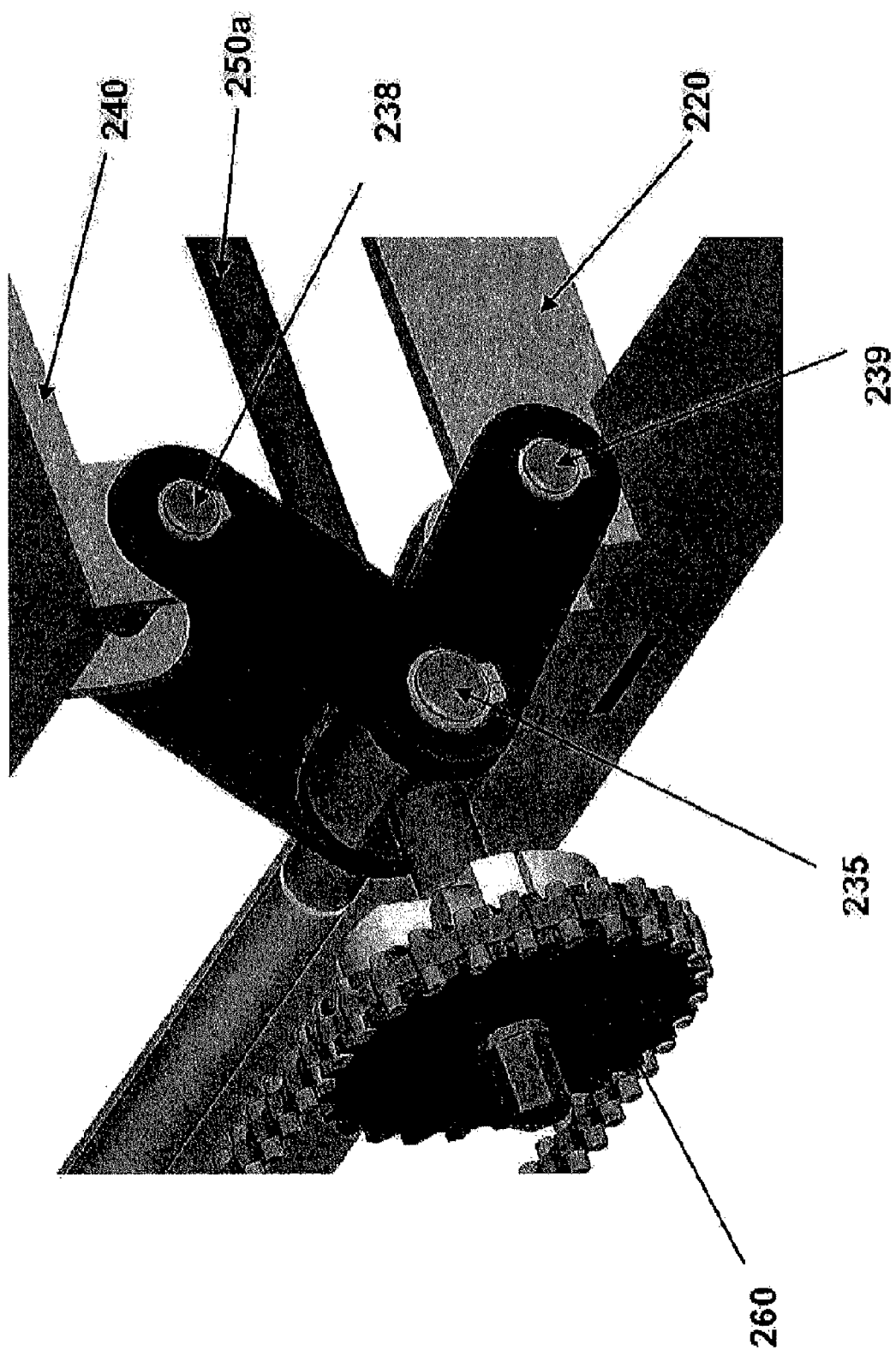
FIG. 4 illustrates an embodiment of a lifting mechanism that may be used in connection with the invention.
Figure 5:
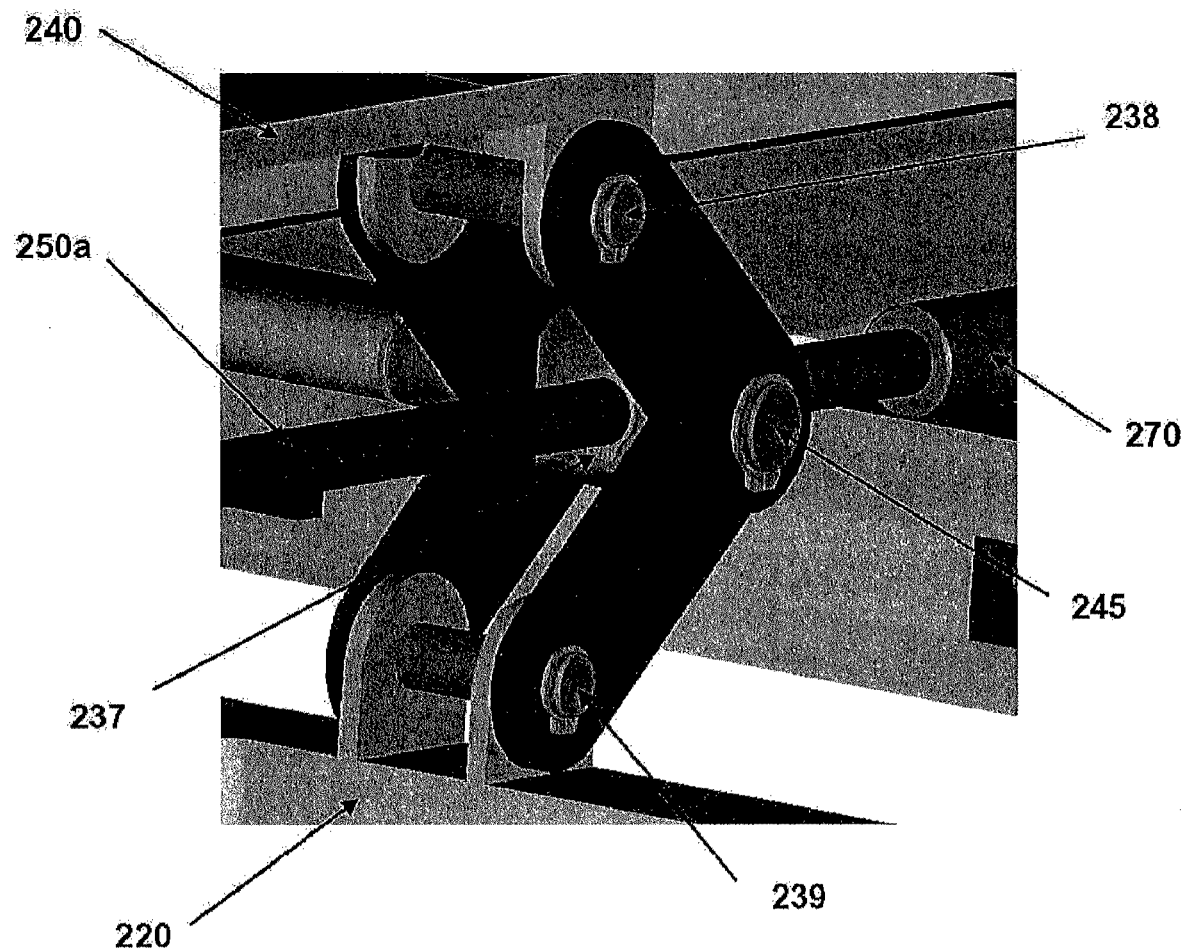
FIG. 5 illustrates an embodiment of a lifting mechanism that may be used in connection with the invention.

Between the module unit 110 and the airspace 120c, within the plenum 300, is a lifting mechanism 200 that has a sealing frame 220 with one or more sealing gaskets 210. In an embodiment, the sealing frame 220 is attached to one arm of a two-armed lever (or jack or extending unit) 230. See FIG. 2. The other arm of the lever 230 is connected to an anchor plate 240, and the anchor plate 240 is attached to the inside of the plenum 300. The two-armed lever 230 has pivot shafts 235 and 245 that pivotally connect the two arms of the lever. Two-armed lever 230 further has an upper pivot shaft 238 and a lower pivot shaft 239. See FIGS. 4 and 5. The actuator shaft 250a is screwed into pivot shaft 235 which has internal threads and the rear of the actuator shaft 250a is anchored into rear pivot shaft 245 with retainer rings 237. The actuator shaft 250a is connected to a second actuator 250b via a sprocket and chain assembly 260. The actuator shaft 250b is further connected to its own two-armed levers. The second actuator shaft 250b is positioned at an end of the anchor plate 240 opposite that of the end at which the screw actuator 250a is positioned. As illustrated in FIG. 2, two or more lifting mechanisms 200 can be connected together by a drive coupling 270. While the lift mechanism has been described as two two-armed levers connected by an actuator shaft, those of skill in the art will realize that other mechanisms could be used to extend and collapse the arms of the levers. A benefit of this particular embodiment shown in FIGS. 1 and 2 is that it provides a controllable pre-load to compress the gasket material a fixed amount, based upon a torque provided to the actuator shaft.

In another embodiment, two two-armed levers are pivotally attached to each other at their two ends. Each two-armed lever is pivotally connected by a pivot shaft and one of them has internal threads. An actuator shaft is inserted and rotated through the hole in the pivot shaft with the internal threads. Then, in this embodiment, since the two ends of each two-end rod are pivotally connected to each other, rotation of the actuator shaft causes each two-armed lever to expand or collapse in unison. In an alternate embodiment, the two two-armed levers may be placed towards the center of the anchor plate and/or sealing frame. With such a placement, guides should be provided inside the open area of the sealing frame. In this alternate embodiment, the sprocket and chain assembly is not required.

In the embodiment of FIG. 2, the actuator shafts 250a and 250b are rotated in one direction, causing the pivot shafts 235 and 245 to move away from each other, thereby causing the arms of the levers to collapse. In this embodiment, this causes the sealing frames and sealing gaskets to draw towards the anchor plate 240. Similarly, when the actuator shafts 250a and 250b are rotated in the opposite direction, the pivot shafts 235 and 245 move towards each other, thereby causing the arms of the levers to extend. In this embodiment, this causes the sealing frame 220 with sealing gaskets 210 to extend away from the anchor plate 240.

In FIG. 2, the two-armed levers that are positioned on the same actuator shaft and positioned on the same end of an anchor plate open towards each other. In an alternate embodiment, two-armed levers connected by an actuator shaft on the same end of an anchor plate can be rotated 180 degrees so that the arms of the lever open and close away from each other. In such an embodiment, moving the pivot shafts of the two-armed lever away from each other on the actuator shaft will cause the two arms of the levers to expand, while moving the pivot shafts of the two-armed levers towards each other would cause the arms of the levers to collapse.

Referring back to FIG. 1, the lift mechanism 200 is attached to the inside of the plenum 300 via anchor plates 240. Consequently, when the actuator shafts 250a and 250b are rotated in one direction, and the arms of the levers collapse, the sealing frames 220 with sealing gaskets 210 are removed from the openings 140a and 140b between the module unit 110 and the plenum 300. With the sealing frames and gaskets moved away from the module unit 110, the module unit 110 can be easily removed for inspection, replacement and/or repair. The module unit 110 can thereafter be re-inserted into the housing 100 (with the arms of the levers still collapsed and the sealing frames 220 with sealing gaskets 210 still removed from the openings 140a and 140b), and the actuator shafts 250a and 250b rotated in the direction that will extend the levers of the jack, which in turn will lower the sealing frames 220 with gaskets 210 onto the module unit 110 at the openings 140a and 140b, thereby reforming an airtight seal between the module unit 10 and the plenum 300.

Figure 3:
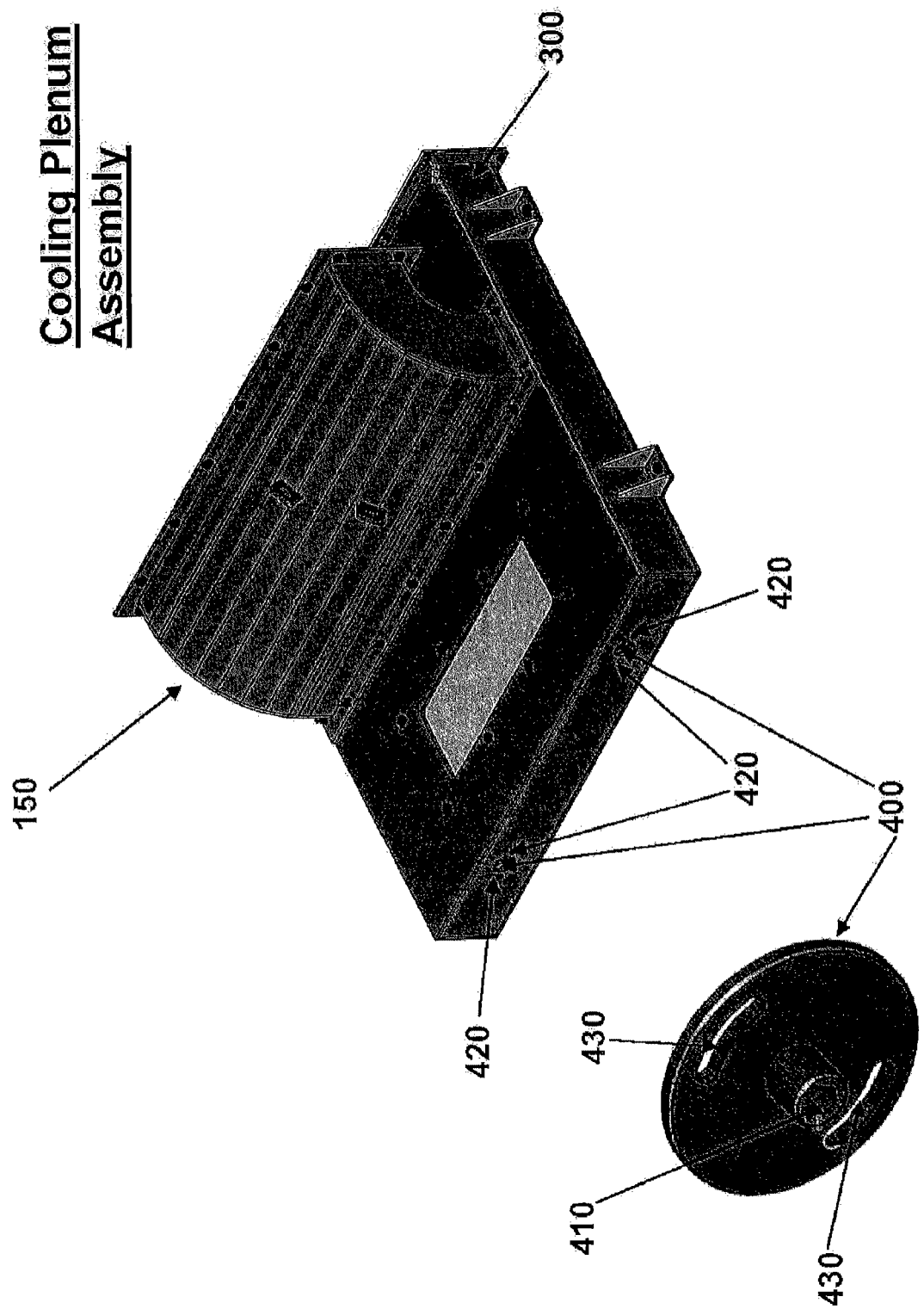
FIG. 3 illustrates a locking bushing that may be used in connection with an embodiment of the invention.

FIG. 3 illustrates a top perspective view of the plenum 150 and 300, and a locking bushing 400. The locking bushing 400 is provided to immobilize the actuator shaft after the sealing frames gaskets are compressed to a fixed amount. This locking bushing prevents any movement of the lift mechanism which may be introduced by high vibration and/or shock environments. The locking bushing 400 has an internal hexagon hole 410, which couples to the actuator shaft 250a and/or 250b by sliding over the actuator shaft 250a and 250b. The locking bushing 400 is retained on the front face surface of the plenum 300 and mounted with two fasteners 420. The actuator shafts 250a and 250b move linearly and rotationally during activation of the lifting mechanism 200. The plenum 300 has an oversized opening to accommodate clearance for the bushing 400 boss. Locking bushing 400 has two slots 430 to provide flexibility for placement of the bushing in any theoretical position of the shaft, based upon the hexagonal position relative to the slots.

In an embodiment involving a VME card chassis, VME chassis maintenance and repair is performed through a front opening on the unit (since unit installation may prohibit access to the sides and rear of the housing unit). Such VME units are normally cooled by a right angle air inlet into the plenum of the housing (see plenum 150 in FIG. 1). In an embodiment, the invention effectively seals the right air angle inlet into the plenum, the VME card chassis, and the power supply without airflow losses. That is, the lift mechanism of the sealing mechanism of the invention provides the ability to retract sealing frames (from the right angle plenum opening) which allows for the removal of the VME chassis and power supply for maintenance and/or repair through the front opening of the housing without removal or disassembly of any other subassembly. This embodiment of the invention is particularly helpful in the high volumetric airflow systems of VME card chassis for cooling the significant heat load produced by large quantities of signal processors contained in dense packaging VME environments with stringent weight and maintainability requirements.

While the invention has been described in its preferred and other embodiments, it is to be understood that the words used are words of description rather than limitation and that changes may be made within the purview of the appended claims without departing from the true scope and spirit of the invention in its broader aspects. For example, while embodiments of the invention have been described in relation to flowing air for cooling purposes, embodiments of the invention may be used in connection with flowing air that is used for other purposes, such as for cleaning.

The invention claimed is:

1. An apparatus comprising:
a first extendible and collapsible lever comprising a first arm and a second arm; a second extendible and collapsible lever comprising a first arm and a second arm; a frame attached to said first lever and said second lever; a first actuator shaft connected to said first lever; a second actuator shaft connected to said second lever; and a sprocket and chain assembly coupling said first actuator shaft and said second actuator shaft; wherein said apparatus is attached to a housing for a module unit, said housing forming an air cooling plenum around said module unit; and further wherein said frame forms a seal between said module unit and said air cooling plenum.

2. The apparatus according to claim 1, wherein said module unit comprises computer components.

3. The apparatus according to claim 1, further comprising an anchor plate attached to said frame.

4. The apparatus according to claim 1, wherein said seal comprises a gasket.

5. The apparatus according to claim 1, wherein upon rotation of said actuator shaft in a first direction, said first lever and said second lever collapse, thereby disengaging said seal between said module unit and said air cooling plenum.

6. The apparatus according to claim 1, wherein upon rotation of said first actuator shaft in a second direction, said first lever and said second lever extends, thereby establishing said seal between said module unit and said air cooling plenum.

7. The apparatus according to claim 1, wherein said first arm and said second arm of said first lever forms an angle, and further wherein upon rotation of said first actuator shaft in a first direction, the magnitude of said angle increases, and further wherein upon rotation of said first actuator shaft in a second direction, the magnitude of said angle decreases.

8. The apparatus according to claim 7, further comprising two or more pivot shafts, said two or more pivot shafts pivotally connecting said first arm and said second arm of said first lever, and further connecting said first arm and said second arm of said second lever, said two or more pivot shafts comprising a threaded hole therein.

9. The apparatus according to claim 7, wherein said increase in said angle of said first lever causes said seal to engage, and further wherein said decrease in said angle of said first lever causes said seal to disengage.

10. The apparatus according to claim 1, wherein upon rotation of either of said first actuator shaft or said second actuator shaft, said first and second actuator shafts operate in unison, thereby causing said first lever and said second lever to operate in unison.

11. The apparatus according to claim 10, further comprising a drive coupling, said drive coupling connected to said first actuator shaft and a third actuator shaft, said third actuator shaft connected to a second apparatus.

12. The apparatus according to claim 1, wherein said first arms and said second arms comprise a first end and a second end, wherein said first arms and said second arms are pivotally connected at their respective first ends and second ends; and further comprising a first pivot shaft and a second pivot shaft, said first pivot shaft pivotally connecting the first arm and the second arm of said first lever, and said second pivot shaft pivotally connecting the first arm and the second arm of said second lever.

13. The apparatus according to claim 12, wherein said first actuator shaft is coupled to said first pivot shaft and said second actuator shaft is coupled to said second pivot shaft, and wherein upon rotation of said first actuator shaft, said first lever and said second lever expand or collapse in unison.

14. An apparatus comprising: a module unit; a housing for said module unit; an air cooling plenum within said housing, said air cooling plenum comprising a passageway communicating between said module unit and said air cooling plenum; and a lift mechanism, said lift mechanism forming a resealable seal for said passageway, said lift mechanism comprising: a first extendible and collapsible lever; a second extensible and collapsible lever; a frame attached to said first lever and said second lever; a first actuator shaft connected to said first lever; a second actuator shaft connected to said second lever; and a sprocket and chain assembly coupling said first actuator shaft to said second actuator shaft.

15. The apparatus according to claim 14, further comprising an anchor plate, said anchor plate connected to said first and said second lever.

16. The apparatus according to claim 15, further comprising a locking bushing connected to first said actuator shaft and mounted to the air cooling said plenum.

17. A system for forming a re-sealable seal in a housing for a module unit comprising: an air cooling plenum within said housing; a frame; and means to move said frame relative to said housing, thereby disengaging said seal when said frame is moved in a first direction, and engaging said seal when said frame is moved in a second direction; wherein said means to move said frame comprises a lever, said lever comprising: a first arm and a second arm, said first arm and said second arm connected by a first pivot shaft, said first arm and said second arm forming a first angle; a third arm and a fourth arm, said third arm and said fourth arm connected by a second pivot shaft, said third arm and said fourth arm forming a second angle; a first actuator shaft connected to said first pivot shaft and a second actuator shaft connected to said second pivot shaft; and a sprocket and chain assembly coupling said first actuator shaft and said second actuator shaft; whereby magnitudes of said first angle and said second angle are changed by the rotation of said first actuator shaft.

18. The system for forming a re-sealable seal according to claim 17, wherein said seal comprises a gasket.

19. The apparatus according to claim 1, comprising: a third lever coupled to said first lever via said first actuator shaft; and a fourth lever coupled to said second lever via said second actuator shaft.

* * * * *